Jan. 3, 1961 C. M. COOPER 2,966,794
DEFLECTION PRESSURE TESTER
Filed July 20, 1945 7 Sheets-Sheet 2

Jan. 3, 1961 C. M. COOPER 2,966,794
DEFLECTION PRESSURE TESTER
Filed July 20, 1945 7 Sheets-Sheet 5

Witnesses:
Herbert E. Metcalf
John B. Willard

Inventor:
Charles M. Cooper
By: Robert A. ______
Attorney

United States Patent Office 2,966,794
Patented Jan. 3, 1961

2,966,794

DEFLECTION PRESSURE TESTER

Charles M. Cooper, Newark, Del., assignor to the United States of America as represented by the United States Atomic Energy Commission Filed July 20, 1945, Ser. No. 606,201

4 Claims. (Cl. 73—40)

The present invention relates to an improvement in the apparatus for testing sealed containers for leaks, especially sealed containers containing a solid substance which is bonded to the container.

Where a substance is placed in a sealed container, it is often desirable to test the container for leaks after the process has been completed. This is especially true in the case of fuel elements for a neutronic reactor. In this case fissionable material such as uranium is placed within a sealed jacket constructed of a material such as aluminum in order to prevent reaction and corrosion of the uranium by contact with a gas or moisture. The fissionable material is bonded to the jacket in order to insure proper heat conduction between the fissionable material and the jacket.

In one type of water-cooled reactor, fuel elements of this type are placed in tubes and cooled by flowing a coolant over them such as water. If there is a flaw in the jacket so that water is able to leak into the fissionable material, chemical reaction will take place, generating gases between the fissionable material and the jacket which cause the jacket to swell. This results in difficulty in removing the fuel element from the tube. Hence, it is highly desirable to determine that no leaks are present in the jacket before the fuel element is placed in the reactor.

It is therefore an object of the present invention to provide a method for testing a sealed container, especially a sealed container suitable for protecting fissionable materials.

A further object is to provide a testing device for ascertaining that such a sealed container is leakproof.

A further object of this invention is to devise a method suitable for testing leaks in sealed containers containing solid material which is bonded to the container.

Another object of this invention is to provide a device for testing leaks in sealed containers containing a solid material bonded to the container.

These and other objects of the invention and the various features and details of the construction and arrangement thereof are hereinafter set forth and described with reference to the accompanying drawings, in which.

Referring more particularly to the drawings, there are illustrated three embodiments of pressure testing devices adapted to determine the leakproof integrity of jacketed metallic bodies. The testing device illustrated in Figs. 1 through 4 is specifically designed for testing the welded, or otherwise sealed, closure end of a cylindrical metal jacket which closely conforms, but is not bonded to an enclosed solid body, such as uranium. Such a body is formed by inserting a uranium body into a can which is open at one end and closed at the other and welding a cover to the open end.

Generally the testing device comprises a pressure chamber 10 adapted to receive and apply gas or other fluid pressure to the sealed end 11 of an aluminum metal jacket 12 enclosing a uranium body 13; mechanism for securing and sealing the jacket end 11 in the pressure chamber 10; and a deflection gauge 14 having an operable finger or feeler 15 engaging the metal jacket 12 so as to indicate any deformation of the jacket resulting from the admission into the jacket of gas pressure through flaws in the sealed end 11.

More specifically, the pressure testing apparatus comprises a base B consisting of a pair of oppositely disposed L-channel beams 20 supporting a rectangular steel bed plate 21 through which extend a pair of vertical guide posts 22. The lower ends of posts 22 are threaded and carry spaced nuts 23 for securing the bed plate 21 to the channel member 20 and the guide posts 22 in a vertical position. Centrally disposed in the bed plate 21 intermediate the posts 22 is a drilled and counter-drilled seat or socket 24 for receiving the pressure chamber or cup member 10 which is secured therein by head screws 25.

The interior of the chamber member 10 contains a central or lower cylindrical well 26 formed by drilling the member 10 to provide a bottom surface 27 and an inner cylindrical wall 28 adapted to loosely receive the sealed end 11 of the jacket 12. Communicating with the lower well 26 is a concentric upper cylindrical well having an outer cylindrical wall 30 that is connected to the inner cylindrical wall 28 by the conically beveled shoulder 31. A cylindrical bushing 32 having an inner bore 33 for loosely receiving the jacket 12 is slidably located by the wall 30 and supported by a neoprene, or other suitable elastic annular ring 34 having a beveled lower surface which conforms to and is seated on the conically beveled shoulder 31. The outer and inner cylindrical walls of the ring 34 loosely conform to the upper well wall 30 and the cylindrical jacket 12, respectively. A coil spring 37 adapted to resiliently support the jacketed body 13 thereon is axially supported on the bottom of the well 26 and is centered therein by a positioning washer 38. Gas or other suitable fluid pressure is introduced into the pressure chamber 10 through a bore 39 connecting the well 26 with a fluid pressure pipe line 40. A suitable gauge 41 and necessary valves 42 in the pipe line 40 provide means for regulating the pressure applied to the welded or sealed end 11 of the jacket 12 in the pressure chamber well 26.

In order to provide a leakproof pressure space about the sealed end 11 of the jacket 12 within the pressure or lower well 26, the bushing 32 is forced downwardly so as to compress the resilient neoprene ring 34 downwardly and inwardly on the beveled shoulder 31 thus forcing the inner ring 34 into fluid-tight engagement with the jacket 12 and thereby preventing escape of the pressure fluid therebetween. At the same time, a positive force is maintained on the jacketed body 13 to prevent pressure in the well 26 from forcing the body 13 from the pressure chamber.

To accomplish this, a lower compressor plate 50 is provided that exerts downward pressure on the bushing 32 and an upper compressor plate 51 that forces the jacketed body 13 downward into the pressure well 26 against the force of the spring 37 and maintains the body thereat during testing.

More particularly, the lower compressor plate 50 comprises a substantially rectangular metal member reciprocally mounted for vertical movement on the posts 22 and provided with a centrally disposed cylindrical opening 52 that permits free movement of the plate 50 relative to the jacketed body 13 extending therethrough. In order to relieve the bushing 32 of the weight of the lower compressor plate 50 in the inoperative or non-compressing position of the apparatus and thus permit ready insertion and removal of the body 13, suitable compression springs 53 are located about the posts 22 and maintain the compressor plate 50 elevated from the bushing 32. The upper compressor plate 51 is likewise mounted for vertical movement on the posts 22 and is provided with a centrally recessed seat 54 and a brass, or similar soft metal pressure ring 55 adapted to transmit the downward force of the compressor plate 51 to the upper end of the jacketed body 13 so as to force the body 13 downward into the pressure well 26 against the compression spring 37 and, thereafter, to hold it there against the force of the testing fluid. The downward force or pressure of the upper compressor plate 51 is exerted on the lower compressor plate 50 through a pair of tubular spacers 56 and surmounted split rubber washers 57 which loosely surround the posts 22.

The downward pressure necessary to force the body 13 into the pressure well 26 and at the same time to form the fluid type seal between the ring 34 and the jacket 12, is impressed on the upper compressor plate 51 and through spacers 56 on the lower compressor plate 50, by a pair of coordinated toggles located at either end of the upper compressor plate 51 and equidistant from the centrally disposed seat 54 so as to assure uniform pressure thereon. More specifically, each toggle comprises a lower toggle link 61 pivotally secured by a stud screw 62, a spacer 63 and a set screw 64 to the end of the compressor plate 51. The upper end of each toggle link 61 is pivotally connected by a stud 65, washers 66, and cotter-pins 67 to the lower end of an upper toggle link 71. The upper end of each upper toggle link 71 is pivotally secured by means of a threaded stud 72, spacers 73 and set screw 74 to opposite ends of a pressure plate 75 mounted for vertical movement on the posts 22. A pair of stops 81 secured as by set screws 82 to the posts 22 limit the downward travel of the pressure plate 75. Upward movement of the plate 75 on the posts 22 is opposed by heavy compression springs 83 which surround the posts 22 and bear at their upper ends against washers 85 restrained by nuts 86 adjustably secured to the upper threaded ends of the posts 22.

Figure 1:
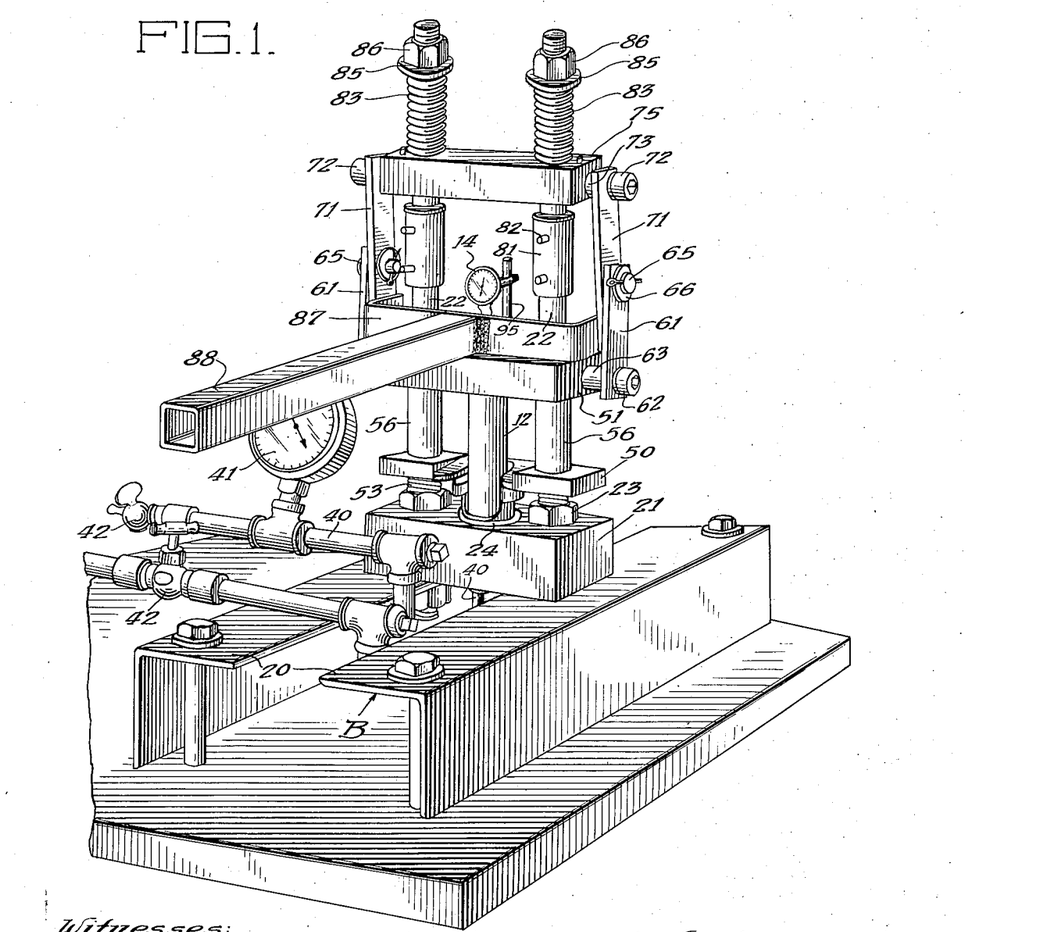
Fig. 1 is a perspective view of one embodiment of a pressure device for testing, in accordance with the present invention, the sealed end of an unbonded jacketed body, wherein the device is illustrated in the closed or testing position.
Figure 2:
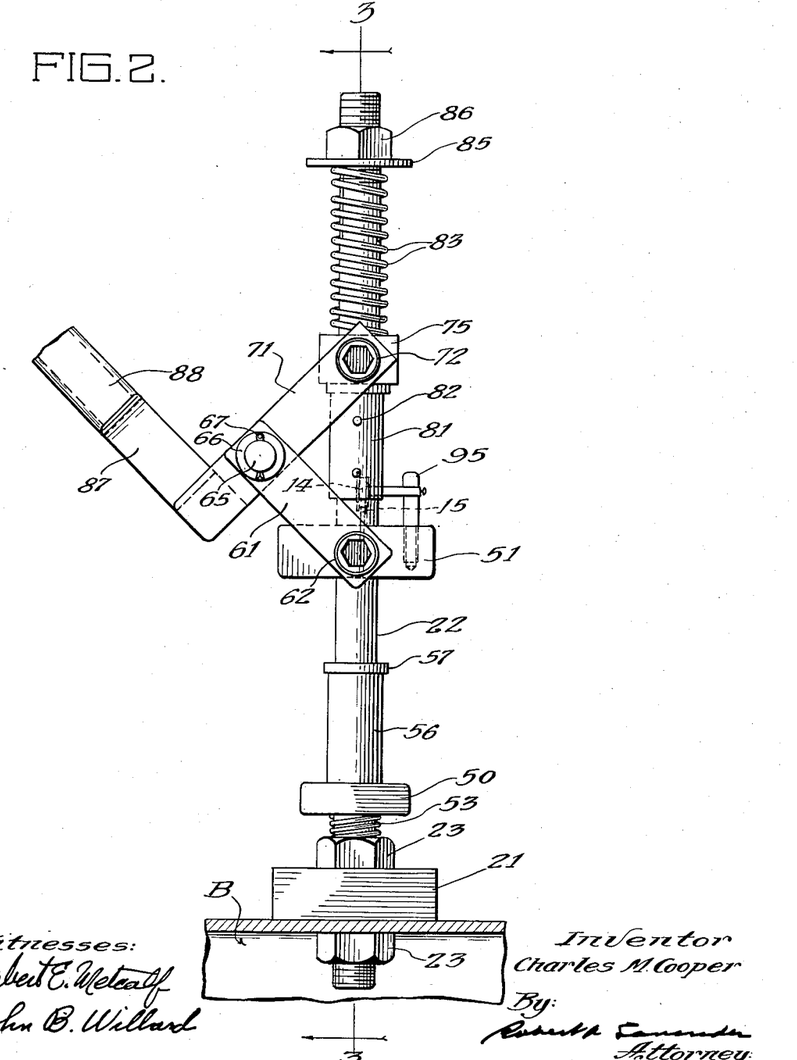
Fig. 2 is a side elevation fragmentary view partially in section illustrating the open or non-testing position of the testing device illustrated in Fig. 1.
Figure 4:
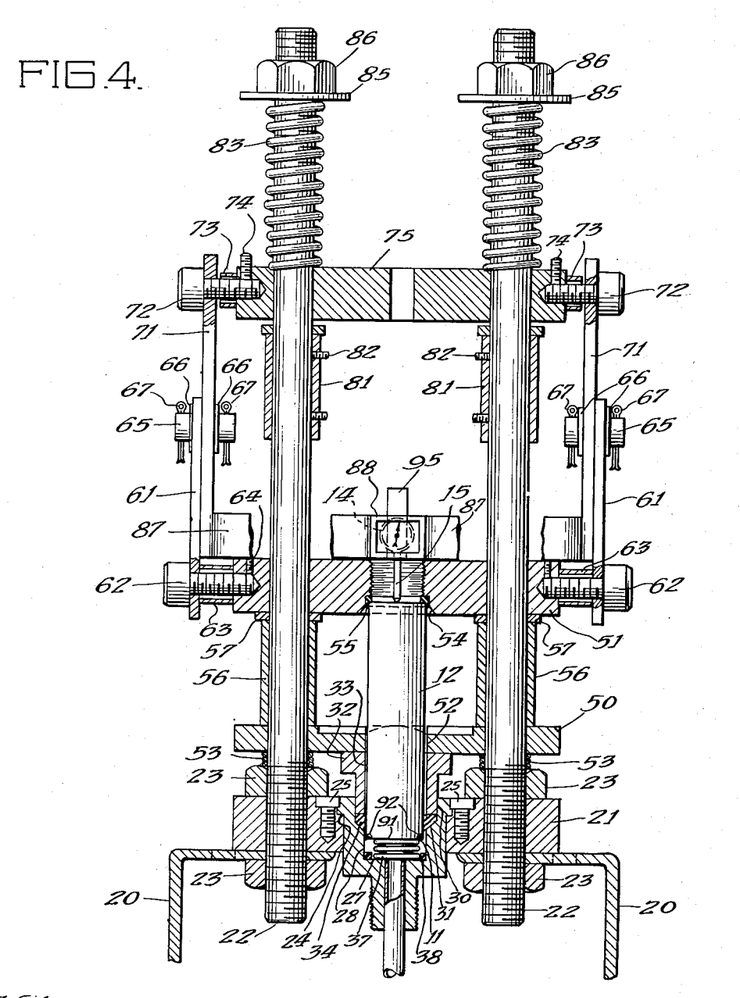
Fig. 4 is a fragmentary view partially in cross-section and similar to Fig. 3 illustrating the jacketed body secured in the pressure chamber in the closed or testing position of the testing device.

In order to force the toggle mechanism from the position illustrated in Fig. 2 to the testing position of the device illustrated in Fig. 1 against the action of the heavy compression springs 83, the upper toggle links 71 are integrally connected downwardly of the pivot studs 65 by a bifurcated spacing member 87 to which there is centrally secured a manually operable arm 88 that provides sufficient leverage to permit manual movement of the handle to the position illustrated in Figs. 1 and 4. By varying the positions of the restraining nuts on the upper ends of the posts 22, it is possible to vary the compression forced exerted by the heavy compression springs 83 on the jacketed body 13 through the toggle links 61 and 71 and the compressor plate 51. The described pressure exerting mechanism insures adequate pressure without overstressing the jacket 12, and thereby eliminates the possibility of fracturing the delicate jacket 12.

In the embodiment of the invention heretofore described in conjunction with Figs. 1 through 4, the end 11 of the jacket 12 is sealed by a suitable closure that, in the present instance comprises a cap 91 and seam weld 92. The sealed end 11 is tested for leaks following insertion in the open position of the testing device illustrated in Figs. 2 and 3 by moving the arm 88 to the position illustrated in Figs. 1 and 4, and thereafter subjecting the welded end 11 in the pressure well 26 to high pressure fluid supplied through the pipe line 40.

If there are flaws or other openings in the weld 92, the testing fluid passes therethrough and the high pressure is exerted on the interior of the jacket 12. Inasmuch as the jacket is not bonded to the uranium body 13, the pressure will be exerted equally throughout the interior of the jacket causing it to bulge outwardly.

In order to ascertain when bulging or deformation takes place indicating a flaw in the weld 92, the deflection gauge 14 is applied to the upper end of the jacket 12.

Any suitable deflection gauge may be used for this purpose. In the embodiment of the testing device illustrated, the deflection gauge is mounted on a pin 95 secured in the upper compressor plate 51 for movement therewith. The feeler 15 of the gauge 14 extends through an opening centrally located in the plate 51 and bears directly on the upper end of the jacket 12. Any change in the reading of the gauge 14 following the application of fluid pressure to the lower end 11 of the jacket 12 indicates a faulty jacket which must be rejected.

Figure 5:
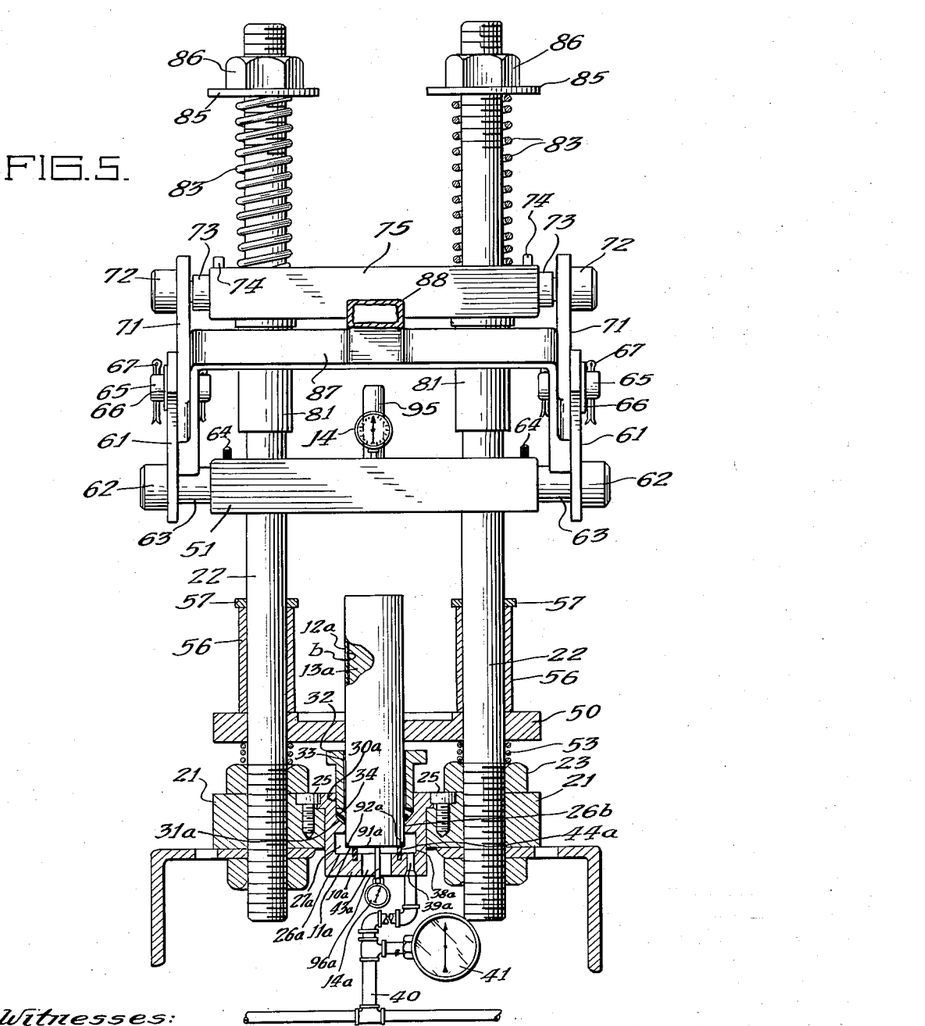
Fig. 5 is a fragmentary front elevation view partially in section and similar to Fig. 3 of a modified or second embodiment of the device shown in Figs. 1 through 4, and illustrates a modified pressure chamber member with which the device is adapted to test the sealed end of a bonded jacketed body.

While the testing device illustrated in Figs. 1 through 4 is satisfactory for discovering faulty welds in unbonded jackets as heretofore described, it is not suitable for testing metal jackets of the type wherein the cylindrical side wall is bonded to the enclosed metal body thus preventing diffusion of the gas throughout the jacket and as a result not exposing the upper end of the jacket to the testing pressure. Fig. 5 illustrates a modification of the testing device suitable for testing the sealed end 11a of a jacket of the bonded type wherein a drawn aluminum metal jacket 12a is secured by means of a suitable bonding material b to the cylindrical surface of an uranium body 13a and the end 11a of the jacket through which the jacketed body is inserted, is sealed by a cap closure 91a and seam weld 92a.

Figure 3:
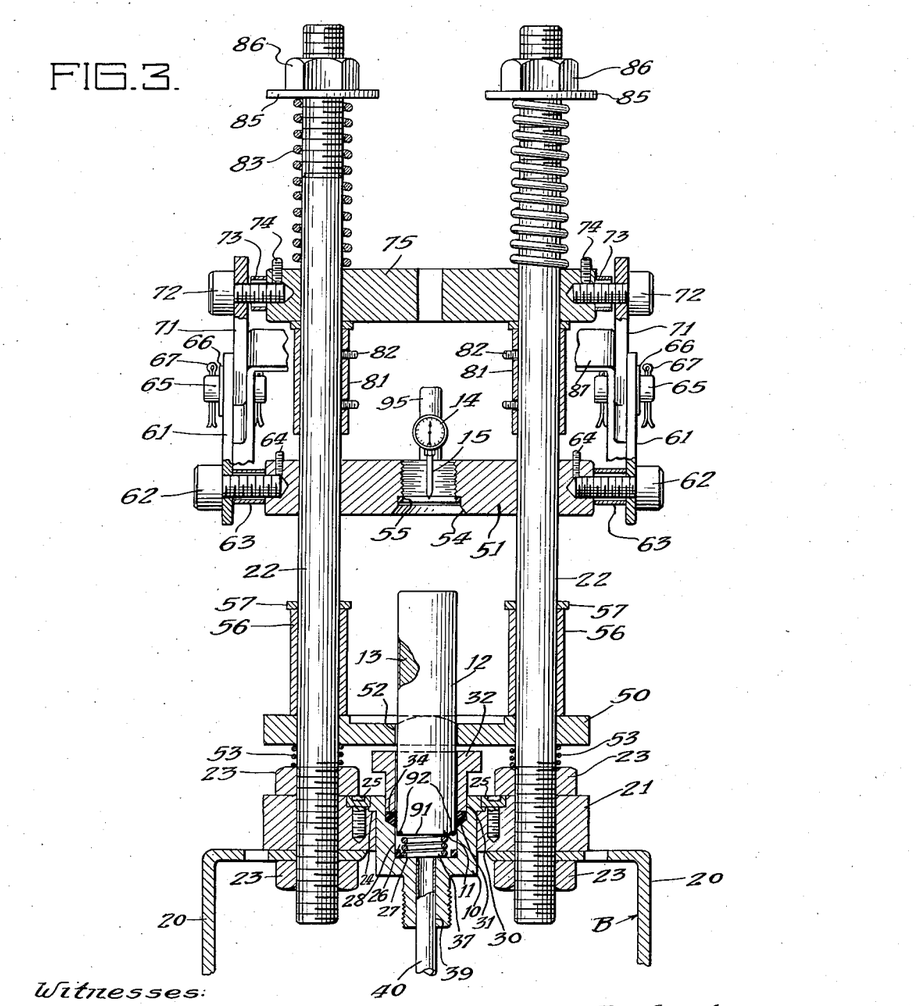
Fig. 3 is a fragmentary front elevation view partially in section taken through line 3—3 of Fig. 2 wherein a portion of the jacket to be tested is broken away to reveal the enclosed uranium body.

More specifically, Fig. 5 illustrates the heretofore described testing device with a modified pressure chamber 10a, substituted for the like externally shaped pressure chamber 10 illustrated in Fig. 3. The pressure chamber 10a is secured to the base plate 21 by the bolts 25 and, with the exception of the location of the deflection gauge 14a, the modified testing device illustrated in Fig. 5 is in all other respects identical with the testing device heretofore described in conjunction with Fig. 1 through 4.

Inasmuch as the interior cylindrical surface of the jacket 12a is secured by the bonding material 3 to the uranium body 13a, any high pressure fluid, which may be introduced for testing purposes through flaws in the weld 92a into the jacket 12a is prevented by the layer of bonding material b from exerting a deflecting pressure on the upper or unsealed end of the jacket. The testing fluid pressure is restricted by the bonding material b to the lower or sealed end 11a of the jacket and consequently the deflection gauge 14a must be located adjacent the base plate of the testing device so that the finger or feeler 96a extends through the channel 43a and bears on the cap 91a. Inasmuch as the cap 91a is not bonded to the uranium body 13a, any fluid pressure greater than atmospheric exerted through flaws in the weld 92a will be impressed on the inner surface of the cap and by subjecting the outer surface of the cap 91a to atmospheric pressure a pressure differential is established that deffects the cap and effects a change in the reading of the gauge 14a to indicate a defectively sealed jacket.

In order to subject the weld 92a and the sealed end 11a to a high fluid pressure, the interior of the pressure chamber 10a includes a pressure well 27a that is formed by the bottom surface 26a and the cylindrical side wall 38a. Extending through the base of the chamber member 10a is a centrally disposed opening 43a that permits insertion of the gauge feeler 96a therethrough into operative contact with the cap 91a and subjects the outer surface of the cap 91a to atmospheric pressure. A suitable non-reactive fluid under pressure greater than atmospheric is introduced through an opening 39a connected to the fluid pressure pipe line 40. The gauge 41 and the necessary valves in pipe line 40 provide means for regulating the pressure in the well 27a that is applied to the welded or sealed end 11a of the jacket. The chamber member 10a also includes an upper well having a cylindrical side wall 30a and beveled shoulder 31a similar to the wall 30 and the beveled shoulder 31 of the first embodiment of the testing device illustrated in Fig. 3. The upper well communicates with the lower or pressure well through a cylindrical bore 26b. As in the first embodiment of the testing device, the cylindrical bushing 32 having an inner bore 33 for loosely receiving the jacketed body to be tested is slidably located by the wall 30a and is supported by the neoprene annular ring 34. In order to provide a leakproof pressure space about the sealed end 11a of the jacket 12a within the pressure or lower well 26a, the resilient neoprene ring 34 is forced downwardly and inwardly by the bushing 32 in the same manner as in the first embodiment as heretofore described. In order to provide a leakproof seal between the lower surface 27a of the pressure chamber member 10a and the end 11a of the jacket 12a so as to expose the seam weld 92a to the testing pressure, a neoprene, or other suitable resilient sealing material, annular ring 44a is located in an annular groove formed in the surface 26a intermediate the bore 43a and the weld 92a.

Thus when the handle 88 is moved to the closed toggle position, the neoprene ring 44a forms a seal between the bottom surface 27a and the jacket cap 91a and, at the same time the neoprene ring 34 forms a seal between the jacket 12a and the beveled shoulder 31a thereby providing a closed pressure chamber in the lower or pressure well 26a about the weld 92a.

In the second embodiment of the invention heretofore described in conjunction with Fig. 5, the end 11a of the jacket 12a is tested for leaks following insertion in the open position of the testing device by moving the arm 88 to the closed position illustrated in Fig. 1, and thereafter subjecting the weld 92a and the adjacent portions of the cap 91a and the jacket end 11a in the pressure well 26 to high pressure gas supplied through the pipe line 40.

If there are flaws or other openings in the weld 92a, the testing fluid passes therethrough and the high pressure is exerted on the interior of the jacket 12a. Inasmuch as the jacket is bonded to the uranium body 13a, the pressure is confined to the lower or sealed end 11a of the jacket and is exerted downwardly on the inner surface of the cap 91a causing it to bulge outwardly against the gauge feeler 96a. Therefore, any change in the reading of the deflection gauge 14a following the application of fluid pressure into the pressure well 26a indicates a faulty or improperly sealed jacket 12a that must be rejected.

Figure 6:
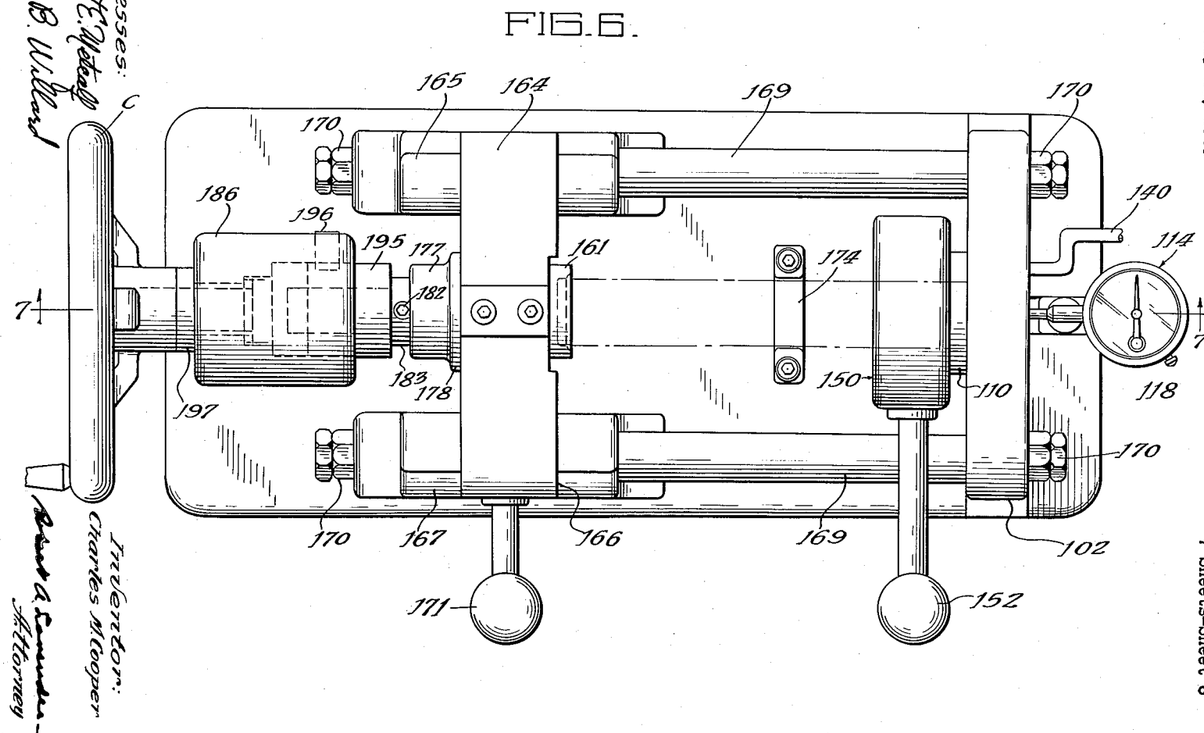
Fig. 6 is a plan view of another pressure testing device for performing the present invention.
Figure 7:
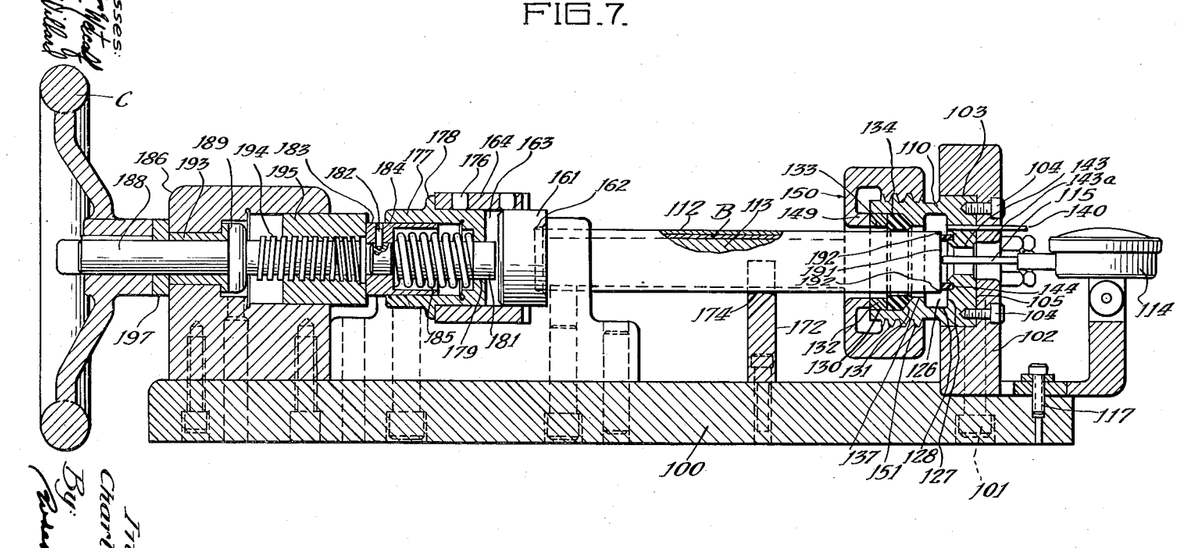
Fig. 7 is a cross-sectional view taken through line 7—7 of Fig. 6.

Figs. 6 and 7 illustrate a third embodiment of the present invention particularly adapted to the application of extremely high testing pressures to the welded or otherwise sealed end of metal jackets. This embodiment is adaptable for testing jackets of both the bonded and the unbonded types but for purposes of illustration, is described in conjunction with a bonded jacket wherein a jacket 112 is bonded to the uranium body 113 by a layer of bonding material b and is sealed by a cap 191 that is secured by a seam weld 192 to the sealed end of the jacket through which the body was inserted into the jacket.

More specifically the testing device includes a substantially flat rectangular base plate 100 adjacent the forward end of which there is secured by bolts 101, a transversely extending vertical support plate 102 having a cylindrical recess 103 in which bolts 104 secure the conforming cylindrical base or closed end 105 of a generally cup-shaped pressure chamber member 110 having a hollow interior opening rearwardly (see Fig. 7) to receive the welded or otherwise sealed end of the cylindrical metal jacket that is to be tested.

More specifically, the interior of the pressure chamber member 110 includes a forward or inner cylindrical pressure well 126 formed by boring the member 110 to provide a circular inner end wall 127 and an inner cylindrical pressure chamber wall 128 of somewhat larger diameter than the cylindrical jacket 112 thta is receivable therein.

An outer or rear cylindrical well having a cylindrical side wall 130 is formed in the member 110 concentric with the inner well 126 and communicates therewith through a restricted passage formed by an inwardly and forwardly, conically beveled shoulder 131 and an intermediate cylindrical wall 137. A cylindrical bushing 132 having an inner bore 133 adapted to loosely receive the jacketed body (Fig. 7) is slidably located in the well formed by the wall 130 and spaced from the beveled shoulder 131 by a neoprene, or other suitable elastic annular ring 134 having a beveled inner or forward end that conforms to the abutting shoulder 131. The outer and inner cylindrical walls of the ring 134 loosely conform to the outer or rear well wall 130 and the cylindrical jacket 112, respectively.

The oute rsurface of the bushing 132 is engaged by the inturned annular lip 149 of a cylindrical compressor member 150 adjustably secured by cooperating threads 151 on the pressure member 110.

A handle 152 extending radially outward from the compressor 150 provides the necessary leverage for tightening or relieving the pressure exerted through bushing 132 on the neoprene ring 134 thereby establishing or disestablishing a positive pressure seal between the pressure chamber 110 and the jacket 112.

A non-reactive gas or other fluid suitable for testing the weld 192 is introduced under pressure into the pressure chamber member 110 through a bore connecting the well 126 with a fluid pressure pipe line 140. Suitable gauges and the necessary valves (not shown) in the pipe line 140 may be provided for regulating the pressure applied to the welded or other wise sealed end 11 of the jacket 112 in the pressure chamber well 126.

Inasmuch as the interior cylindrical surface of the jacket 112 is secured by the layer of bonding material b to the uranium body 113, any high pressure fluid that may be introduced for testing purposes through flaws in the weld 192 into the jacket 112 is restricted by the bonding layer b and exerts a deflecting pressure on the inner surface of the cap 191 that is not bonded to the body 113.

The outer surface of the cap 191 is exposed to atmospheric pressure by aligned cylindrical passages 143a and 143 in the forward support 102 and the pressure chamber base 105, respectively, through which the feeler 115 of a deflection gauge 114 extends into operative contact with the center of tthe jacket sealing cap 191. The gauge 114 is secured by a screw 117 to the forward end of the base plate 110 with the gauge dial 118 located in a horizontal position forwardly of the passage 143 in the support 102.

In order to centrally expose the cap 191 to atmospheric pressure and, at the same time expose the outer periphery of the cap 191 and the weld 192 to pressure above atmospheric in the perssure well 126, a seal is provided between the cap 191 and the well wall 127 comprising an annular neoprene ring 144 located in an annular groove in the wall 127 intermediate the passage 143 and the weld 192.

Pressure is exerted axially on the jacketed member so as to force the cap 191 of the jacket into tight sealing engagement with the ring 144 and the jacketed member maintained thereat by a cylindrical chuck plunger 161 having a recessed seat 162 therein for receiving the rear end of the jacket 112. The chuck plunger 161 is reciprocally mounted within a longitudinally extending cylindrical bore 163 in a transversely disposed yoke 164 that is pivotally secured at one end in a yoke block 165 and removably secured at the other end within a conforming slot 166 in a second yoke block 167. Both yoke blocks 166 and 167 are secured to the base plate 100 by bolts and are braced relative to the forward support 102 by spaced bracing rods 169 secured thereto by nuts 170. A handle 171 is secured to the free end of the yoke 164 for manually pivoting the yoke into and out of the yoke block slot 166 thus facilitating the insertion and removal of the jacketed member 133 in the pressure chamber member 110 and the chucking plunger seat 162. A guide block 172 is secured to the base plate 100 as by bolts and provides a curved support rest 174 for the jacket member 113 intermediate the pressure chamber 110 and the chuck 161 so as to further facilitate insertion and removal of the member 113.

Secured rearwardly of the chuck 161 in the cylindrical bore 163 by a set screw 176 is a cylinder 177 having an external annular shoulder 178 abutting the rear surface of the yoke 164. A guide bore 179 in the forward end of the cylinder 177 reciprocally guides the forward end of a plunger 181 that is axially aligned and engageable with the chuck 161. Rearwardly, the plunger 181 is secured by a set screw 182 in a piston 183 that is reciprocally moutned in a cocentric cylindrical bore 184 in the cylinder 177. A compression spring 185 surrounds the plunger 181 and bears internally on the cylinder 177 and the piston 183 so as to normally maintain the plunger 181 disengaged from the chuck 161.

In order to overcome the action of the spring 185 and force the plunger 181 forward so as to secure the jacketed body 113 between the chucking plunger 161 and the sealing ring 144, there is provided a manually operable pressure applying mechanism including a journal bearing block 186 that is secured by bolts to the base plate 100. A spindle 188 having a thrust shoulder 189 is rotatably supported by a collared brass bearing 193 press-fitted into a conforming bore in the block 186. The threaded forward end 194 of the spindle carries a cylindrical thrust nut 195 located in a conforming cylindrical aperture in the block 186. A milled dowel key 196 in the block 186 limits the nut 195 to reciprocal travel. The nut 195 may reciprocate in the block 186, but it is prevented from rotating by the key 196 (Fig. 6). A hand wheel and crank C is keyed and secured to the outer or rear end of the spindle with a suitable antifriction washer 197 interposed between the hand wheel C and the housing block 186.

In operating the testing device heretofore described the wheel C is rotated to disengage the thrust nut 195 from contact with the piston 183; and the yoke 164 is pivoted out of the slotted yoke block 167 by the handle 171 to permit the ready insertion of the sealed end 111 of the jacket body 113 into the pressure chamber 126. Thereafter the yoke 164 is seated in the slot 166 of the yoke block 167 and the rear end of the jacketed body 133 is seated in the chucking plunger 165. The pressure tight seal is formed between the jacket cap 191 and the pressure well wall 127 by rotating the hand wheel C and forcing the thrust nut 195 forward against the piston 183 thereby compressing the spring 185 and causing the plunger 181 to engage and force the chucking plunger 165 forward to secure the jacketed body 113 in sealing position against the ring 144.

Thereafter the handle 152 is moved to tighten the compression member 150 on the chamber member 110 and through the bushing 132 to exert a sealing pressure on the neoprene ring 134 between the jacket 112 and the pressure chamber member 110.

The end 111 of the jacketed member 113 thus sealed in the pressure well 126 is then subjected to the gas or other non-reactive fluid that is admitted under pressure through the pressure pipe line 140.

If there are flaws or other openings in the weld 192, the testing fluid passes therethrough and the high pressure is exerted on the interior of the cap 191. Inasmuch as the central portion of the exterior of the cap 191 is exposed only to atmospheric pressure, a pressure differential is established on either side of the cap causing it to bulge outwardly and actuate the deflection gauge feeler 115. Any change in the reading of the gauge 114 following the application of fluid pressure on the lower end 111 of the jacket 112 indicates a faulty jacket which must be rejected.

From the foregoing, it will be observed that the present invention provides a novel method of testing the leakproof integrity of sealed metal jackets or containers enclosing uranium metal or other highly reactive bodies and particularly the seam-welded or otherwise sealed portion of the jacket through which the metal body was originally inserted. It is also obvious that the method may be applied equally well to jackets that are either bonded or not bonded to the enclosed body.

While three embodiments of testing devices suitable for testing, in accordance with the invention, both bonded and unbonded types of sealed jacekts have been illustrated and described herein, it is not intended that the invention be limited to such disclosures, and changes and modifications may be made and incorporated as desired without departure from the invention as defined by the scope of the following claims.

What is claimed is:

1. A testing device adapted to test the leakproof integrity of a portion of a sealed container containing a solid substance bonded to all but one end of the container comprising, in combination, a receptacle adapted to receive the unbonded end of a sealed container to be tested and provided with a chamber positioned to be contiguous only to the periphery of the end of a container when placed within the receptacle, a seal mounted within the orifice of the receptacle and adapted to seal a container to the receptacle, a second seal mounted in the receptacle and adapted to seal the periphery of a container when mounted within the receptacle from the center portion of that end of said container, means for establishing a different fluid pressure in said chamber than exists on the center portion of the unbonded end of the container, and means for ascertaining the deflection of the center portion of the unbonded end of the container when said different fluid pressure is exerted on the inner surface of the portion of said container within the chamber through a flaw in that portion of the container.

2. A testing device adapted to test the leakproof integrity of a sealed end of a closed cylindrical container that encloses and conforms to a solid body, the cylindrical surface of which is bonded thereto except on one end, including a receptacle having an orifice adapted to receive the unbonded end of the container to be tested and provided with a chamber positioned to be contiguous to the periphery of the unbonded end of a container when placed within the receptacle, a first fluid-tight sealing member normally loosely positioned between said chamber and the cylindrical surface of the container in said pressure chamber, a second fluid-tight sealing member between said chamber and the center portion of the unbonded end of said container, mechanism for simultaneously moving said sealing members to sealing position, means including a source of fluid pressure for establishing a different pressure in said chamber than exists on a center portion of the unbonded end of the container that is outside said sealing members, and flaw indicating means mounted to contact the center portion of the end of a container that is inserted in the receptacle including a deflection gauge response to deflection of said container.

3. A testing device adapted to test the leakproof integrity of a portion of a sealed container containing a solid substance bonded to all but one end of the container comprising, in combination, a receptacle adapted to receive the unbonded end of a sealed container to be tested and provided with a chamber positioned to be contiguous only to the periphery of the end of a container placed within the receptacle, a first seal mounted within the orifice of the receptacle for sealing the periphery of the container to be tested to the receptacle, a second seal mounted in the receptacle adapted to seal the periphery of the container to be tested from the center portion of that end of said container, and means for ascertaining the deflection of the center portion of that end of the container when a different fluid pressure is exerted on the inner surface thereof through a flaw in the seal of the container.

4. A testing device adapted to test the leakproof integrity of a portion of a sealed container containing a solid substance bonded to all but one end of the container comprising, in combination, a receptacle having a cylindrical orifice therein adapted to receive the unbonded end of a cylindrical sealed container to be tested, a first seal mounted about the periphery of the orifice for sealing the periphery of the container to be tested into the receptacle, a sealing ring having a diameter smaller than the diameter of the orifice and smaller than the diameter of the container to be tested, said ring being sealed to the receptacle about and normal to the axis of the orifice therein and adapted to seal the center portion of the end of the container to be tested from the periphery of the container, and deflection indicating means extending through the ring for detecting the deflection of the center portion of the end of the container to be tested.

References Cited in the file of this patent
UNITED STATES PATENTS

| | | |
|---|---|---|
| 314,180 | Hutchings | Mar. 17, 1885 |
| 1,825,699 | Landrum | Oct. 6, 1931 |
| 2,339,639 | Henszey | Jan. 18, 1944 |